C. N. HAUFFE.
TIRE RIM.
APPLICATION FILED JULY 15, 1920.
1,394,009.  Patented Oct. 18, 1921.
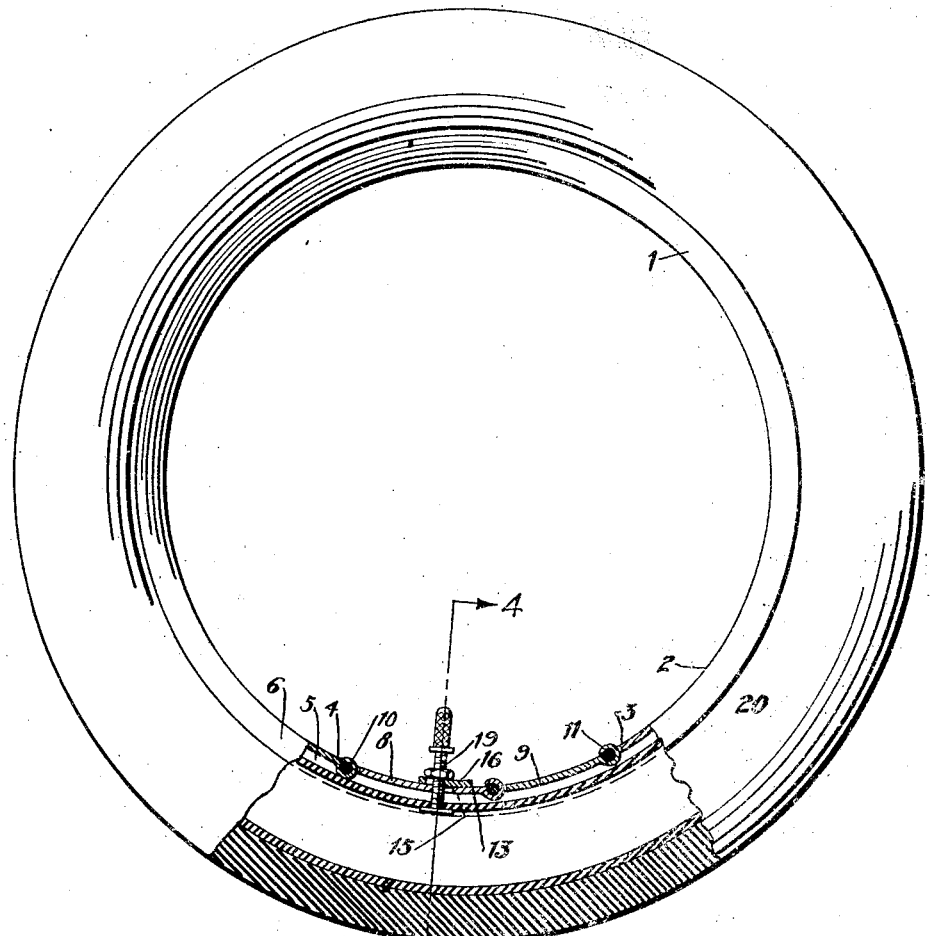
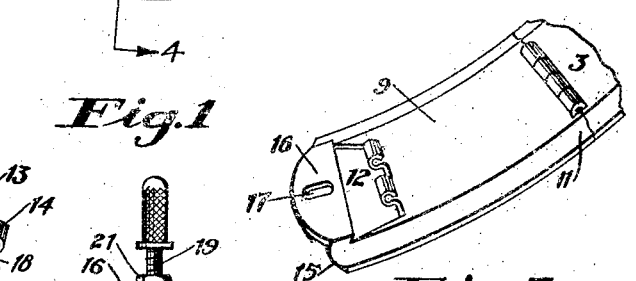
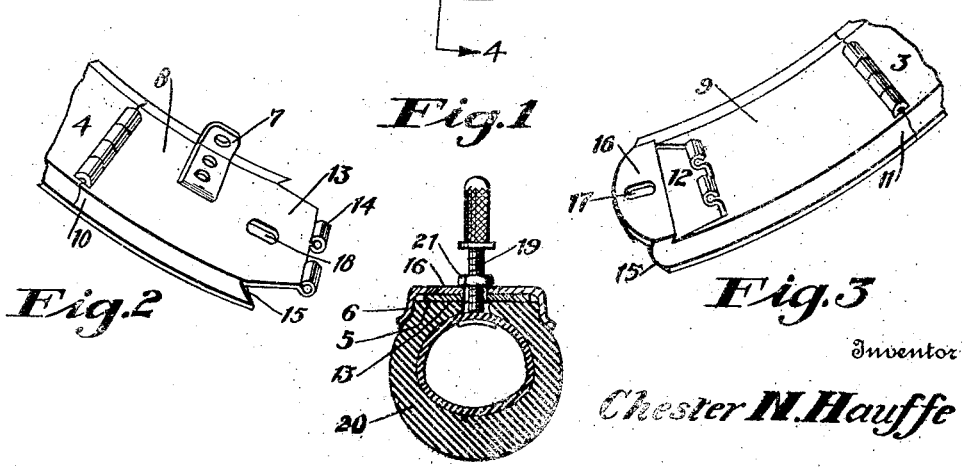
Inventor
Chester N. Hauffe
C. C. Shepherd
Attorney

UNITED STATES PATENT OFFICE.

CHESTER N. HAUFFE, OF COLUMBUS, OHIO.

TIRE-RIM.

1,394,009.

Specification of Letters Patent.   Patented Oct. 18, 1921.

Application filed July 15, 1920. Serial No. 396,464.

*To all whom it may concern:*

Be it known that I, CHESTER N. HAUFFE, a citizen of the United States, residing at Columbus, in the county of Franklin and State of Ohio, have invented certain new and useful Improvements in Tire-Rims, of which the following is a specification.

This invention relates to improvements in tire rims, and has particular reference to the so called collapsible type of rim wherein is embodied a resilient body portion and a pair of hinged toggle sections which serve, upon the application of properly directed pressures, to expand or contract the effective diameter of the rim for the express purpose of facilitating the placing of a pneumatic tire upon the rim or the removal thereof without requiring the use of special tools or exhausting manual efforts.

In practice it has been found that when a rim of the above character is carried as a spare, that is independently of the vehicle wheels, the shocks and jolts imparted thereto by the operation of the vehicle, will frequently cause the toggle sections to move out of their rim expanding positions and thereby permitting of the accidental collapsing of the rim, with the result that a tire carried thereby is released from locked engagement with the rim and may consequently work itself loose from the latter so as to become lost or, at least, the rim when so carried has required the operator of the vehicle to at frequent intervals inspect the same for the purpose of ascertaining and preserving its expanded condition in order to avoid accidental tire loss for the reasons above given.

It is therefore, a primary object of the invention to provide a collapsible rim of the above character which when carrying a pneumatic tire will be so constructed that its toggle sections will provide overlapping portions when the rim is expanded, and to form these portions with registering openings through which the air valve structure of the tire is passed, said valve structure being adapted to carry a threaded nut which is brought into firm and positive engagement with the toggle sections so as to securely lock the latter to the tire and to effectually prevent accidental inward collapsing movement on the part of said sections, this construction operates to insure the retention of the tire in its properly applied position upon the rim, and by eliminating the likelihood of the loss of the tire, an objection of considerable importance against the use of a collapsible rim of the character stated is eliminated.

For a further understanding of the invention reference is to be had to the following description and to the accompanying drawing, in which similar characters of reference denote like and corresponding parts throughout the several views thereof:

Figure 1 is a side elevation of the improved rim and tire construction comprising the present invention, parts being shown in vertical section to more clearly disclose underlying structure, Fig. 2 is a detail perspective view of one of the toggle sections of the rim, Fig. 3 is a similar view of the other cooperating section.

Fig. 4 is a transverse vertical sectional view taken on the plane indicated by the line 4—4 of Fig. 1.

As shown in the accompanying drawing, the present invention consists in the provision of a demountable tire rim 1 which is adapted to be employed for the purpose of carrying the pneumatic tire of a motor vehicle. This rim consists of a substantially resilient and circular body portion 2 which is preferably formed from sheet metal and includes a pair of relatively spaced ends 3 and 4. In transverse cross section the body portion 2 is of the usual tire retaining construction and therefore includes a tire receiving channel 5 and the usual laterally flaring side flanges 6. Preferably, the body portion is provided with a plurality of circumferentially spaced lugs 7, which are adapted to be utilized for the purpose of securing the rim in an applied position upon the felly, not shown, of a vehicle wheel.

As is well known, it is an extremely difficult matter to force an ordinary pneumatic tire over the side flanges of the usual form of rim, inasmuch as this operation usually requires the use of special tools or of considerable manual effort and exertion on the part of the operator. This difficulty is eliminated by the use of the rim 1, wherein features of construction are provided for controlling at will the effective diameter of the rim, whereby the same may be conveniently collapsed when a tire is being placed thereabout, and may likewise be similarly expanded to lock the tire in secured relation therewith. This result is achieved by the provision of a pair of toggle sections 8 and 9 which are adapted to be secured to the spaced ends of the body portion and to be capable upon the application of properly directed pressures to either expand or contract the rim. Thus, the section 8 is hinged as at 10 to the end 4 of the body portion 2 and, similarly, the section 9 is hinged as at 11 to the end 3 of the section 9. Then, to cause the toggle sections to move in unison the section 9 is provided with a recess 12 which is adapted to receive a tongue extension 13 provided on the section 8. As shown, the said extension 13 is hinged as at 14 to the inner wall of the recess 12. Shoulders 15 are provided upon the ends of the sections 8 and 9 and are situated in spaced relationship from the hinge construction 14.

By virtue of this construction it will be manifest that by employing manual foot pressure the toggle sections may be forced downwardly and outwardly into their rim expanding positions and this movement is continued until said sections are forced into true annular positions within the rim 1, the normal resiliency of the body portion serving to maintain the expanded positions of said toggle sections and to preserve the circular shape of the rim. In fact, the resiliency of the body portion will maintain the shoulders 15 in engagement with each other and also the meeting edges between the ends 10 and 11 of the toggle sections and the ends 3 and 4 of the body portion. In cross section the sections 8 and 9 are similar to the configuration of the body portion, a feature which will be clearly understood. To contract the rim, it is simply necessary to drop the same sharply upon a nonyielding surface so that the sections will be forced inwardly. After the sections have moved past the plane of the hinges 10 and 11, the normal resiliency of the body portion will continue the inward movement thereof until the rim assumes its finally collapsed form. The inward positions of the sections result in contracting the rim to such extent that a pneumatic tire may be readily connected to or removed therefrom.

Coming now to the essential feature of the present invention, the section 9 is provided with a strip 16 which connects transversely the ends of the section 9 and serves to overcome the weakness in the latter provided by the inclusion of the recess 12. This strip is provided with an opening 17, which is arranged to aline, when the sections are in expanded positions, with a similar opening 18 provided in the section 8. These openings are so positioned that the same will receive the air valve structure 19 of a pneumatic tire 20 carried by the rim, and this arrangement is provided in order that the exterior nut 21 threaded upon the outer portion of the structure 19 may be threaded into clamping relationship with the inner surface of the strip 16. By virtue of this construction it will be manifest that when the tire 20 is so clamped into engagement with the sections 8 and 9, said tire will be positively locked in its position of application upon the rim. Therefore, when the rim is carried independently of the wheels of the vehicle, it will be impossible for the toggle sections to accidentally spring inwardly so as to assume inactive rim collapsing positions, since by the provision of the combination of parts recited, more particularly the nut 21, inward movement of said sections will be effectually precluded. Thus, a tire may be safely carried by the rim and will be at all times permanently locked and held in connection therewith. The construction described prevents the accidental loss of tires, heretofore caused by the accidental collapsing of the toggle sections and in this manner serves to eliminate the salient objection to the use of collapsible rims.

What is claimed is:

1. In a collapsible tire rim, a substantially resilient body portion having a pair of spaced ends, toggle sections hinged to said ends and capable of expanding and contracting said rim, and said sections being each formed with an opening capable of being brought into registering relation when said rim is expanded, whereby the air valve structure of a pneumatic tire is capable of being positioned within said openings in such manner as to lock said toggle sections against accidental movement.

2. In a collapsible tire rim, a substantially resilient body portion having a pair of spaced ends, toggle sections having their outer portions hinged to said ends, the inner portions of said toggle sections being hinged to each other, said sections being formed to include portions capable of assuming overlapping relationship when the rim is expanded, and said overlapping portions being each formed with a registerable opening adapted for the reception of the air valve structure of a tire carried by the rim.

3. A tire rim comprising a substantially resilient metallic body formed to include separated and spaced ends, a pair of hinged toggle sections having their outer portions hinged to said ends, the meeting ends of said sections being formed to include a tongue extension capable of lying within a recess formed in the other coöperative section, said extension being pivotally connected to the inner wall of said recess, shoulders formed with the adjacent ends of said sections and situated in offset relationship with respect to the hinge of said tongue extension and operating to arrest outward movement on the part of said sections, and a strip formed with the section in which the recess is provided, said strip being capable of engaging with the other complemental section to relieve said shoulders of the stresses set up by the expanding movements of the sections, and said strip being further provided with an opening capable of receiving the air valve structure of a pneumatic tire carried by said rim, whereby said structure will serve to lock said sections to said tire.

In testimony whereof I affix my signature.

CHESTER N. HAUFFE.